United States Patent
Fischer

(10) Patent No.: US 6,209,907 B1
(45) Date of Patent: Apr. 3, 2001

(54) DEVICE FOR FIXING A GAS BAG IN ITS FOLDED POSITION AND A SIDE GAS BAG MODULE

(75) Inventor: Anton Fischer, Leinweiler (DE)

(73) Assignee: TRW Occupant Restraint Systems GmbH & Co. KG, Aldorf (DE)

( * ) Notice: Subject to any disclaimer, the term of this patent is extended or adjusted under 35 U.S.C. 154(b) by 0 days.

(21) Appl. No.: 09/579,655

(22) Filed: May 26, 2000

(30) Foreign Application Priority Data

May 28, 1999 (DE) .......................................... 299 09 326 U

(51) Int. Cl.[7] .......................... B60R 21/20; B60R 21/22; A44B 21/00
(52) U.S. Cl. .................................... 280/728.3; 280/730.2; 24/543
(58) Field of Search ............................. 280/728.3, 730.2, 280/732; 24/543; 403/329

(56) References Cited

U.S. PATENT DOCUMENTS

| | | | |
|---|---|---|---|
| 4,380,103 | * | 4/1983 | McGrath et al. ........................ 24/543 |
| 4,609,171 | * | 9/1986 | Matsui ................................. 248/74.3 |
| 5,109,576 | * | 5/1992 | Teekell et al. ........................... 24/559 |
| 5,123,146 | * | 6/1992 | Olson ..................................... 24/487 |
| 5,230,489 | * | 7/1993 | White et al. ............................. 24/543 |
| 5,315,733 | * | 5/1994 | Ledingham ............................. 24/543 |
| 5,414,911 | * | 5/1995 | Adams .................................... 24/543 |
| 5,520,410 | * | 5/1996 | Sun ...................................... 280/728.3 |
| 5,598,608 | * | 2/1997 | Naslund .................................. 24/543 |
| 5,639,049 | * | 6/1997 | Jennings et al. ...................... 248/74.2 |
| 5,641,178 | * | 6/1997 | Lee ...................................... 280/728.3 |
| 5,676,393 | * | 10/1997 | Rose ................................... 280/728.3 |
| 5,799,971 | * | 9/1998 | Asada ................................. 280/728.3 |
| 5,820,422 | * | 10/1998 | Chadbourne et al. ................. 24/543 |
| 5,852,850 | * | 12/1998 | Hanten et al. ....................... 24/20 R |
| 6,106,006 | * | 8/2000 | Bowers et al. ..................... 280/730.2 |
| 6,106,007 | * | 8/2000 | Kretschmer et al. ............. 280/730.2 |

FOREIGN PATENT DOCUMENTS

19752989A1 * 6/1998 (DE) .............................. B60R/21/20

* cited by examiner

Primary Examiner—Brian L. Johnson
Assistant Examiner—Joselynn Z. Sliteris
(74) Attorney, Agent, or Firm—Tarolli, Sundheim, Covell, Tummino & Szabo L.L.P.

(57) ABSTRACT

The invention relates to a device for fixing a gas bag in its folded position. The device comprises a one-piece hollow body, which has a U-shaped cross-sectional profile, a first and a second side wall, a connecting web and a flap section formed on the first side wall. A clip connection is provided by means of which the flap section can be connected with the second side wall having a bracket. Two longitudinal slits are incorporated in the flap section and an elastically flexible closure hook is provided which is separated from the flap section by the two longitudinal slits. The closure hook has a thickened free end which when the body is closed engages behind the bracket formed on the second side wall. Further, the invention relates to a side gas bag module.

14 Claims, 1 Drawing Sheet

DEVICE FOR FIXING A GAS BAG IN ITS FOLDED POSITION AND A SIDE GAS BAG MODULE

TECHNICAL FIELD

The invention relates to a device for fixing a side gas bag in its folded position and to a side gas bag module.

BACKGROUND OF THE INVENTION

A device known from the DE 197 52 989 A1 consists of several clip-like plastic bodies arranged distributed over the length of a side gas bag which has a large area. These plastic bodies surround the folded side gas bag, form its housing, as it were, and hold it in its folded position. Furthermore, by means of these clip-like bodies, the gas bag is attached to the vehicle along the roof frame. The clip connection consists of a hook-like extension on a side wall, which is intended to engage into a slit in the other side wall. To close the clip-like body, it is necessary to press the side walls together, which, however, is not possible without greater expenditure of force owing to the low packing dimension and the high packing density of the gas bag.

BRIEF SUMMARY OF THE INVENTION

The invention provides a device for fixing the gas bag, in which the closing of the body can take place more simply. This is achieved in a device which comprises a one-piece hollow body, which has a U-shaped cross-sectional profile, a first and a second side wall, a connecting web and a flap section formed on the first side wall. A clip connection is provided by means of which the flap section can be connected with the second side wall having a bracket. Two longitudinal slits are incorporated in the flap section and an elastically flexible closure hook is provided which is separated from the flap section by the two longitudinal slits. The closure hook has a thickened free end which when the body is closed engages behind the bracket formed on the second side wall. The device is, due to the slits, only integrally formed with the remainder of the flap section in a portion of the flap section where no slits are provided. In the device according to the invention, the entire side wall or the entire flap section does not have to be bent or elastically deformed in order to achieve an engaging of the clip connection, because a closure hook is worked out from the flap section, so that the entire bending resistance of the flap section does not have to be overcome in order to engage the clip connection.

Preferably, the closure hook projects outwards with respect to the flap section in the non-closed state of the body or is even angled outwards and projects outwards with respect to the flap section. Thus, by pressing onto the outer surface of the closure hook a large distance can be covered for closing the clip connection, in which the closure hook does not have to be pressed with a high resistance into the immediately adjoining gas bag. In addition through this construction, the surface which must be directly pressed against in order to close the body, is able to be reached more easily and can also be better detected.

The body is to be able to be opened by a small but precisely predefined force by the unfolding gas bag. This is achieved for example in that the bracket is very wide with respect to the closure hook. In the previously mentioned prior art, the slit was just as wide as the closure hook, so that the bracket adjoining the slit was automatically very rigid, which made the opening of the body difficult. In the device according to the invention, on the other hand, the bracket is preferably to connect two parallel side edges of the side wall, i.e. is to project up to the side edges. In so doing, it can be approximately twice as wide as the free end of the closure hook, which gives it a high flexibility.

The opening of the body can be achieved in that the bracket yields relative to the closure hook and the clip connection is released, or the bracket can also tear out. In each case, however, by selection of material and material thickness, it must be established exactly when and how the body is opened, so that the unfolding behavior can also be predetermined.

The invention further relates to a side gas bag module for fastening to a vehicle along a roof frame thereof, the module comprising a device for fixing a gas bag in its folded position, at least one body being provided which embraces the gas bag and forms a housing for the gas bag.

Either several bodies are provided distributed over the length of the gas bag and spaced apart from each other, which position the gas bag as it were as clips and hold it in the folded state, or an elongated body receives the gas bag and extends along the roof frame of the vehicle.

DETAILED DESCRIPTION OF THE PREFERRED EMBODIMENTS

Figure 1:
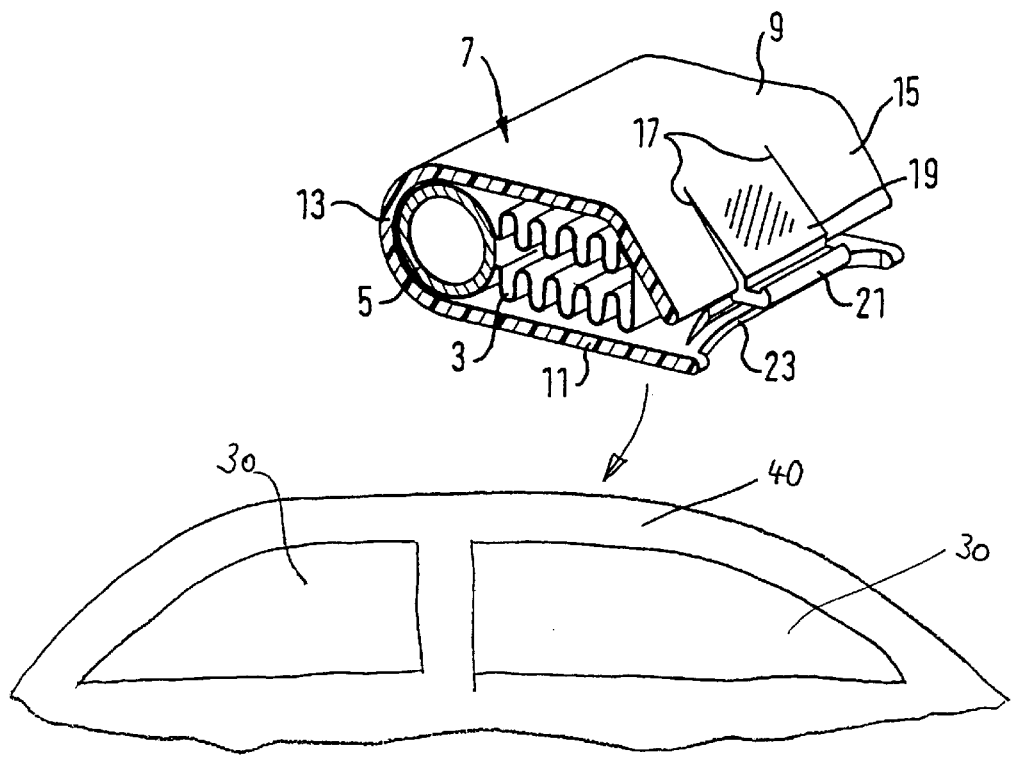
FIG. 1 shows a cross-sectional view through a first embodiment of the side gas bag module according to the invention with a device according to the invention.

In FIG. 1 a segment of an elongated side gas bag module is illustrated, which has a gas bag 3 and a gas distribution pipe 5 and also a plastic housing 7 surrounding the gas bag 3 and the gas distribution pipe 5, which housing 7 represents a hollow elongated body. This housing forms in addition a device for fixing the gas bag 3 in its folded, illustrated position. The body has a first side wall 9, a second side wall 11 parallel to the first, and also a connecting web 13. A flap section 15 is formed on the first side wall 9, angled obliquely to the side wall 11. The flap section 15 serves for closing the body and is intended to be swung outwards on opening of the body, in order to free the way for the unfolding gas bag 3. In FIG. 1, there can be further seen a schematic side view of a vehicle side structure, in which the side windows of the vehicle are referenced by 30 and the roof frame by 40. The plastic housing 7 is arranged on the roof frame in such a manner that the connecting web 13, with regard to the housing 7, is situated at the top and that the first side wall 9 faces the vehicle occupant.

Two parallel slits 17 in the flap section 15 separate a closure hook 19 therefrom. In the non-closed state of the housing, illustrated in FIGS. 1 and 2, the closure hook 19 projects outwards (in the direction opposite to the side wall 11) with respect to the flap section 15, by being bent outwards with respect to the flap section. The free end 21 of the closure hook is thickened and can have an edge in the form of a barb. The thickened free end 21, in the closed state of the housing, engages behind a bracket 23, which is twice as wide as the thickened free end 21. The end opposite to the thickened free end is integrally formed with the flap section 15.

The gas bag module is assembled by the flap section 15, together with the first side wall 9, and the second side wall 11 being pressed apart, so that the gas bag 3 with the gas distribution pipe 5 can be pushed in. The side walls 9, 11, just like the flap section 15, spring back again when they are subsequently let go. To close the housing, however, the closure hook 19 still has to be pressed down at the hatched area, so that the thickened free end 21 can latch behind the bracket 23 and engages behind it. If necessary, to close the housing, the side wall 9 together with flap section 15 must also be pressed against the folded gas bag 3. The narrower the spacing of the two longitudinal slits 17, all the smaller is the force necessary for bending the closure hook 19, but all the smaller also is the holding force of the closure hook on the bracket 23.

Figure 2:
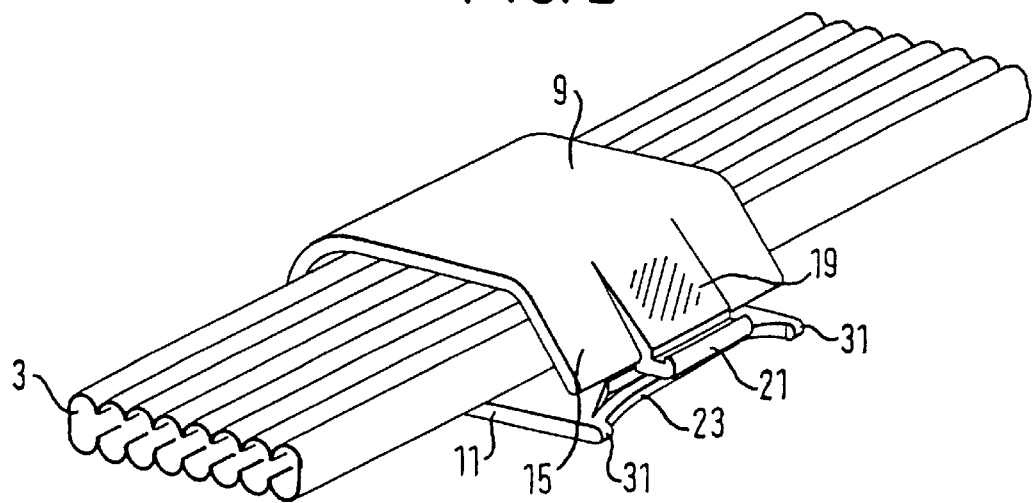
FIG. 2 shows a perspective view of a second embodiment of the side gas bag module according to the invention with the device according to the invention.

Whereas in the embodiment illustrated in FIG. 1 the body, U-shaped in cross-section, forms an elongated housing, the body illustrated in FIG. 2 is very narrow and forms only a narrow clip for holding the gas bag together. Therefore, several such bodies are provided, distributed over the length of the gas bag. The bodies together with the gas bag also form in the embodiment illustrated in FIG. 2 a gas bag module which in this embodiment, however, does not have a gas distribution pipe 5. Also in this embodiment, the bracket 23 is distinctly wider than the thickened free end 21 of the closure hook 19. The bracket 23 extends over almost the entire width of the body. Narrow webs 31, forming the side edges of the second side wall 11 are connected by the bracket 23.

In the embodiment illustrated in FIG. 1, the housing is opened in that the thickened free end 21 slides along the bracket 23 and the clip connection opens again.

In the embodiment illustrated in FIG. 2, on the other hand, the bracket 23 is constructed so as to be weaker than in the one previously mentioned, so that it tears in a predetermined manner.

What is claimed is:

1. A device for fixing a gas bag in its folded position, comprising a one-piece hollow body, which has a U-shaped cross-sectional profile, a first and a second side wall, a connecting web and a flap section formed on said first side wall, a clip connection being provided by means of which said flap section can be connected with said second side wall having a bracket, two longitudinal slits being incorporated in said flap section and an elastically flexible closure hook being provided which is separated from said flap section by said two longitudinal slits, said closure hook having a thickened free end which, when said body is closed, engages behind said bracket formed on said second side wall.

2. The device according to claim 1, wherein said closure hook projects outwards with respect to said flap section in a non-closed state of said body.

3. The device according to claim 2, wherein said closure hook in a not yet closed state of said body is angled outwards with respect to said flap section.

4. The device according to claim 1, wherein said second side wall includes two parallel side edges which are connected by said bracket.

5. The device according to claim 1, wherein said bracket is approximately twice as wide as said thickened free end of said closure hook.

6. The device according to claim 1, wherein said closed body has inner faces and wherein said closure hook and said bracket are coordinated with each other such that with an application of a force onto said inner faces of said closed body, said bracket tears and thereby said body is opened.

7. A side gas bag module for fastening to a vehicle along a roof frame thereof, said module comprising a device for fixing a gas bag in its folded position, comprising a one-piece hollow body, which has a U-shaped cross-sectional profile, a first and a second side wall, a connecting web and a flap section formed on said first side wall, a clip connection being provided, by means of which said flap section is able to be connected with said second side wall, said second side wall having a bracket, two longitudinal slits being incorporated in said flap section and an elastically flexible closure hook being provided which is separated from said flap section by said two longitudinal slits, said closure hook having a thickened free end which when said body is closed engages behind said bracket formed on said second side wall, at least one body being provided which embraces said gas bag and forms a housing for said gas bag.

8. The side gas bag module according to claim 7, wherein several bodies, spaced apart from each other, are provided so as to surround said gas bag over the length of said gas bag.

9. The side gas bag module according to claim 7, wherein said body is constructed so as to be elongated and has several fastening hooks.

10. The side gas bag module according to claim 7, wherein said closure hook projects outwards with respect to said flap section in a non-closed state of said body.

11. The side gas bag module according to claim 10, wherein said closure hook in a not yet closed state of said body is angled outwards with respect to said flap section.

12. The side gas bag module according to claim 7, wherein said second side wall includes two parallel side edges which are connected by said bracket.

13. The side gas bag module according to claim 7, wherein said bracket is approximately twice as wide as said thickened free end of said closure hook.

14. The side gas bag module according to claim 7, wherein said closed body has inner faces and wherein said closure hook and said bracket are coordinated with each other such that with an application of a force onto said inner faces of said closed body, said bracket tears and thereby said body is opened.

* * * * *